3,177,087
METHOD OF COATING AN ALKENYL AROMATIC RESINOUS ARTICLE WITH A COPOLYMER OF VINYL AROMATIC COMPOUND, ALKYL ACRYLATE AND UNSATURATED ACID

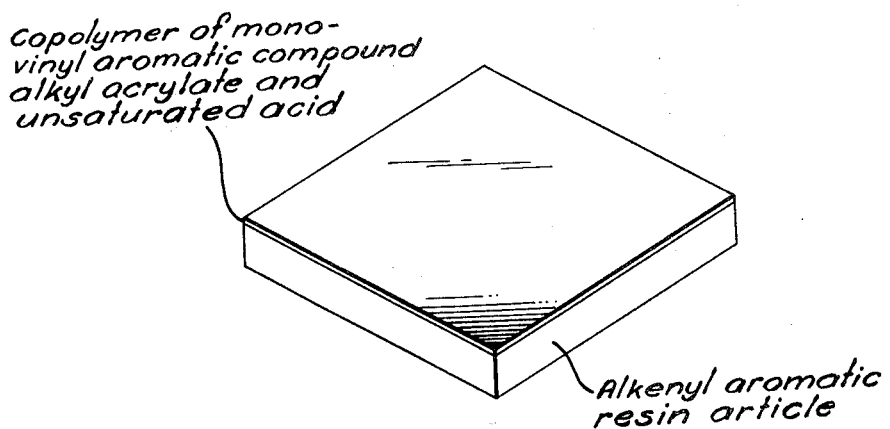

William R. R. Park and Jerome H. Stickelmeyer, Midland, Mich., assignors to The Dow Chemical Company, Midland, Mich., a corporation of Delaware
Filed Nov. 2, 1961, Ser. No. 149,715
7 Claims. (Cl. 117—47)

This invention relates to a method for the preparation of a heat sealable, coated oriented alkenyl aromatic resinous shaped article. It more particularly relates to a method for the preparation of an alkenyl aromatic resinous shaped article such as a film or sheet having a heat-sealable coating of a copolymer of a vinyl aromatic compound containing an acrylate and certain unsaturated organic acids.

The invention is particularly adapted to be practiced with integral solid styrene polymer film or sheets. Such a polymer, which may have an essentially linear molecular configuration or be in a cross-linked form, is employed herein as being generally representative of alkenyl aromatic compounds of the type that contain at least about 50 weight percent of at least one polymerized alkenyl aromatic compound or monomer having the general formula: Ar—CR=CH$_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of α-methyl styrene, ar-methyl styrene (or vinyl toluene), the several mono- and di-chlorostyrenes and ar-dimethyl styrenes, including copolymers thereof with such materials as vinylidene chloride and acrylonitrile; and graft copolymers with other polymeric substances (such as other elastomeric polymers) may frequently be utilized with benefits commensurate with or in excess of those which are derivable from employment of polystyrene alone.

Flexible films may be prepared from the above-described thermoplastic materials by thermal fabrication, specifically extrusion. Processes, techniques, and apparatus for such fabrication are known. Other techniques include solvent casting the compositions from a volatile solvent followed by evaporation of the solvent. Flexible films of these alkenyl aromatic resins may be prepared in a variety of gauges, colors, and widths. As commercially available, such films are sold in a thickness of from about 0.0003 to about 0.015 inch. Since the modifications contemplated by this invention involve primarily surface phenomena, they are adaptable to any size, shape or thickness where uniform coatings may be applied. The modifications are also useful with other moldings, extrusions, or any other thick section of a rigid or semi-rigid nature. However, with such articles of thick section the need for heat sealability is rather remote. Consequently, the attainment of that property alone may not be justification for the treatment. However, the process results in other advantages, as will be described. Thus, it is not intended to limit the process or the resulting articles to any particular shape, although heat-sealable, coated flexible films and sheets are the more frequently desired end-products.

Oriented alkenyl aromatic resinous film and similar shaped articles present great difficulty in the heat sealing thereof. As the temperature of the film or shaped article is raised to a point where heat sealing will occur, shrinkage and distortion of the body to be sealed will take place prior to joining the opposed surfaces. This situation leads to unsightly and undesirable seals which lack strength and are, in general, unacceptable. In United States Letters Patent 2,979,419, a method is disclosed for rendering alkenyl aromatic resins heat sealable by employing a dual coating system. The disclosed process renders alkenyl aromatic resinous shaped articles heat sealable below the temperature at which they shrink and yet renders them substantially block free up to temperatures of 50° to 60° centigrade. The process set forth in the patent provides a barrier coating as well as the heat sealable coating. Unfortunately, no heat sealable coatings were known which would give improved scratch resistance and heat sealability through a single coating and drying operation. Thus, the application of an adhesive coat with subsequent application of a heat seal and barrier coat presents, in certain cases, a serious economic disadvantage where only a heat seal coat is required.

It is an object of this invention to provide a single coat heat sealable coating for alkenyl aromatic resins.

It is a further object of this invention to provide a sealable coating for alkenyl aromatic resins which is substantially block free up to about 50° and even 60° centigrade.

It is another object of this invention to provide a heat seal coating formulation for alkenyl aromatic resins which does not include a flammable volatile solvent.

It is a further object of this invention to provide a heat seal coating for alkenyl aromatic resinous shaped articles which may be applied from an aqueous dispersion.

These benefits and other advantages are readily achieved in accordance with the invention by applying to a hydrophylic surface of an alkenyl aromatic resinous article a continuous coating comprised of an aqueous dispersion of a copolymer consisting essentially of (a) from 48 to 60 percent by weight of a mono-vinyl aromatic compound of 8 to 10 carbon atoms wherein the vinyl group is attached directly to the benzene ring; (b) from 30 to 45 percent by weight of an alkyl acrylate comprising at least 50 percent by weight of the total of the acrylate of an alkyl acrylate having from 1 to 2 carbons in the alkyl group, any remaining portion of the alkyl acrylate containing from 3 to 5 carbon atoms in the alkyl group; and (c) from about 1 to about 10 percent by weight of a copolymerizable unsaturated acid selected from the group consisting of methacrylic acid and itaconic acid, subsequently drying from said aqueous dispersion to deposit a continuous adherent coating on said shaped article. An article in accordance with the invention is depicted in the drawing.

Surfaces of alkenyl aromatic resinous shaped articles are rendered hydrophylic by several treatments well known to the art. In general, any treatment which renders polyethylene more printable causes an alkenyl aromatic resinous surface to become more hydrophylic. Typical treatments are surface sulphonation, surface chlorination, corona discharge techniques and similar electronic treatments, as well as flame treating. Some of the processes which are adaptable to the purpose of the present invention are described in United States Letters Patents 2,632,921; 2,648,097; 2,704,382; 2,910,723; 2,939,956; 2,876,185; 2,876,186; and 2,876,187. The degree of surface treatment necessary is only sufficient to cause the aqueous polymeric dispersion to wet the surface of the film evenly. The addition of conventional surface active agents to the coating composition usually results in inferior sealing characteristics, and often blocking of the coated film at lower temperatures.

The coating composition utilized in the practice of the invention is an aqueous dispersion or latex of a copolymer having three essential components. One is a monovinyl aromatic monomer such as styrene or vinyltoluene vinylxylene and vinyl ethyl benzene. The second component of the copolymer system in an acrylic acid ester or mixture thereof containing up to about 5 carbon atoms in the alkyl group. The third component is itaconic acid or methacrylic acid or mixtures thereof and is incorporated in the monomer mixture in proportions from about 1 to about 10 percent. If desired, the blocking characteristics of the coated shaped article may be altered by changing the composition of the acrylate components of the copolymer. Block free results are had at temperatures of about 50° centigrade when the acrylate component comprises at least 50 percent of an acrylate having from 1 to 2 carbon atoms in its alkyl group such as the methyl acrylate or ethyl acrylate, the remainder comprising alkyl acrylates containing up to 5 carbon atoms in the alkyl group. Beneficially, the compositions employed in the coatings in accordance with the invention are prepared by what is frequently referred to as the "soap free polymerization" which is interpreted to mean containing not over one percent of wetting agent or surface active agent, based on the weight of the charge and preferably a quantity of wetting agent should not exceed one-half of one percent. Such polymerizations are well known in the art, and beneficially in the preparation of coating compositions in accordance with the invention, small quantities of comonomeric ionic emulsifiers may be employed, such as 2-sulfoethyl acrylate and the like.

A typical polymerization recipe comprises 53 parts of styrene, 37.4 parts ethyl acrylate, 5.8 parts normal butyl acrylate, 3.8 parts methacrylic acid, .75 part 2-sulfoethyl acrylate. The monomeric ingredients are mixed together and added over a period of about one hour to 150 parts of water, held at a temperature of 70° centigrade and containing one percent potassium persulphate based on the weight of the monomer charge. The reaction mixture is gently agitated for the duration of the reaction, which is approximately 9 hours. Advantageously other components may be added to the coating system perior to its application onto the hydrophyllic surface of the alkenyl aromatic resinous shaped article. Typical additives are dyes, pigments, wax, fillers, and the like. Generally, such additaments should not exceed about 10 percent by weight of the polymeric substituents of the dispersion. Otherwise the sealing, blocking, and other characteristics may be adversely affected. Advantageously, the use of certain waxes, such as carnauba wax, in quantities up to 10 percent advantageously raise the blocking temperature about 10° centigrade. Aqueous dispersions of polymeric coating compositions are readily applied to alkenyl aromatic resinous shaped articles by rolling, dipping, spraying, brushing and the like. Beneficially, when such compositions are applied to thin films such as 1 to 2 mil thick oriented polystyrene film such as it conventionally available in long rolls of considerable width, material is readily coated by contacting a bath and metering an even coating of the aqueous dispersion on its surface by means of air doctors, wire wound rods, and the like.

Subsequent to the application thereof, the coating is dried by exposure to a current of warm humid air, infrared lamps, or similar conventional means. The coating compositions utilized in the practice of the present invention must be dried to yield substantially continuous coating. Usually, the wet coat should be raised to a temperature of about 50° centigrade before the water is permitted to escape, otherwise a dusty and discontinuous coating will result. The drying temperature should not be sufficiently high to cause deorientation of the alkenyl aromatic resin substrates. Once the film is coated, cooled and wound into a stock roll, no difficulty is encountered with blocking of the coated product when stored at temperatures up to about 50° centigrade.

By way of further illustration, a number of different latexes were prepared in the manner as previously outlined. The compositions of these latexes are set forth in Table I. The latexes were deposited from 35–50 percent solids dispersions in water on the surface of one mil thick oriented polystyrene film which was rendered hydrophylic by a corona discharge treatment to give a coating of about 0.0001 inch in thickness and subsequently dried between a temperature of about 50° centigrade and about 90° centigrade. The coated film was then subjected to a test for blocking. The blocking test comprised placing the coated film in face to face contact under a pressure of about 1 pound per square inch for a period of about 16 hours. Various samples of the film undergoing block tests were maintained at specified temperatures, and after a 16 hour period had elapsed, pressure was removed from the film samples and they were gently peeled apart by hand. If the samples freely separated, no blocking occurred, this is designated in Table I in the column "blocking at 50° C." by the word "none." Heat sealing was accomplished in a conventional manner in a jaw sealer whose jaws were heated to a temperature of about 70–85° centigrade and having a dwell time of about 1 second. The heat seals were then tested by pulling the seals apart, that is, by applying tension at 90° to the surface of the seal. When the seals have been pulled apart, if the film surfaces that were sealed together indicated mechanical damage and a minimum force of about 100 grams per inch required for separation, this phenomenon is designated as a strong seal, and is so indicated in Table I. Generally a force of from about 200 to 250 grams is required to separate the sealed film.

*Table I*

| Example | Styrene | o-Vinyl Toluene | Methyl Acrylate | Ethyl Acrylate | n-Butyl Acrylate | Methacrylic Acid | Itaconic Acid | Blocking at 50° C. | Heat Seal |
|---|---|---|---|---|---|---|---|---|---|
| 1 | 58.8 | | | | 39.2 | 2 | | None | Strong. |
| 2 | 52 | | | 40 | 6 | 2 | | do | Do. |
| 3 | 55 | | | 37 | 6 | 2 | | do | Do. |
| 4 | 53 | | | 37 | 6 | 4 | | do | Do. |
| 5 | 55.2 | | | 35.2 | 5.8 | 3.8 | | do | Do. |
| 6 | 51.8 | | | 36.6 | 5.7 | 5.9 | | do | Do. |
| 7 | 50.8 | | | 35.9 | 5.6 | 7.7 | | do | Do. |
| 8 | 49.9 | | | 35.2 | 5.5 | 9.4 | | do | Do. |
| 9 | 53 | | 37.4 | | 5.8 | 3.8 | | do | Do. |
| 10 | 53 | | | 37.4 | 5.8 | | 3.8 | do | Do. |
| 11 | 53 | | | 37.4 | 5.8 | 3.8 | | do | Do. |
| 12 | 55.2 | | | 38.8 | 2.1 | 3.9 | | do | Do. |
| 13 | 54 | | | 38 | 4.1 | 3.9 | | do | Do. |
| 14 | 50.9 | | | 35.9 | 9.6 | 3.6 | | do | Do. |
| 15 | | 53 | | 37.4 | 5.8 | 3.8 | | do | Do. |

In a similar manner, other alkenyl aromatic resinous films and shaped articles are readily rendered heat sealable and block free at 50° centigrade by the application of latex compositions in accordance with the invention.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention,

What is claimed is:

1. A method of rendering alkenyl aromatic resinous shaped articles heat sealable below its heat distortion temperature and block free at 50° centigrade, steps of said method comprising
   applying to a hydrophylic surface of an oriented alkenyl aromatic resinous shaped article a coating,
   said coating comprising an aqueous dispersion of a copolymer consisting essentially of
   (a) from about 48 to 60 percent by weight of a monovinyl aromatic compound of 8 to 10 carbon atoms wherein the vinyl group is attached directly to the benzene ring;
   (b) from 30 to 45 percent by weight of an alkyl acrylate comprising at least 50 percent by weight of the total of the acrylate of an alkyl acrylate having from 1 to 2 carbons in the alkyl group, any remaining portion of the alkyl acrylate containing from 3 to 5 carbon atoms in the alkyl group; and
   (c) from about 1 to about 10 percent based on the weight of the copolymer of a copolymerizable unsaturated acid selected from the group consisting of methacrylic acid and itaconic acid, subsequently
   drying said aqueous dispersion to deposit a substantially continuous adherent coating on said shaped article.

2. The method of claim 1, wherein said shaped article comprises polystyrene.

3. The method of claim 1, wherein said aqueous copolymer coating is dried at a temperature of from about 50° centigrade to below the deorientation temperature of the oriented alkenyl aromatic resinous shaped article.

4. The method of claim 1, wherein said alkenyl aromatic resinous shaped article is a film.

5. The method of claim 4, wherein said monovinyl aromatic compound of the coating copolymer is styrene.

6. The method of claim 4, wherein said unsaturated acid of the coating copolymer is methacrylic acid.

7. The method of claim 4, wherein said film has been subjected to a corona discharge to render its surface hydrophylic.

References Cited by the Examiner

UNITED STATES PATENTS

| | | | |
|---|---|---|---|
| 2,859,481 | 11/58 | Kaghan et al. | 117—47 |
| 2,955,054 | 10/60 | Park et al. | |
| 2,962,465 | 11/60 | Lindstrom et al. | 260—29.6 |

WILLIAM D. MARTIN, *Primary Examiner.*

RICHARD D. NEVIUS, *Examiner.*